(12) United States Patent
Hoglund

(10) Patent No.: US 11,274,844 B2
(45) Date of Patent: Mar. 15, 2022

(54) SYSTEMS AND METHODS FOR CONTROLLING A SINGLE-ZONE CLIMATE CONDITIONING SYSTEM IN A MULTI-ZONED MANNER

(71) Applicant: Johnson Controls Technology Company, Auburn Hills, MI (US)

(72) Inventor: David E. Hoglund, Shorewood, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 139 days.

(21) Appl. No.: 16/705,079

(22) Filed: Dec. 5, 2019

(65) Prior Publication Data

US 2021/0172633 A1    Jun. 10, 2021

(51) Int. Cl.

| F24F 11/30 | (2018.01) |
|---|---|
| G05B 13/04 | (2006.01) |
| F24F 11/56 | (2018.01) |
| F24F 11/63 | (2018.01) |
| F24F 11/74 | (2018.01) |
| F24F 11/54 | (2018.01) |
| F24F 120/20 | (2018.01) |
| F24F 110/10 | (2018.01) |
| F24F 120/12 | (2018.01) |

(52) U.S. Cl.
CPC ............ *F24F 11/30* (2018.01); *F24F 11/54* (2018.01); *F24F 11/56* (2018.01); *F24F 11/63* (2018.01); *F24F 11/74* (2018.01); *G05B 13/048* (2013.01); *F24F 2110/10* (2018.01); *F24F 2120/12* (2018.01); *F24F 2120/20* (2018.01)

(58) Field of Classification Search
CPC ......... G05B 13/048; F24F 11/30; F24F 11/54; F24F 11/56; F24F 11/63; F24F 11/74; F24F 2110/10; F24F 2120/12; F24F 2120/20
See application file for complete search history.

(56) References Cited

U.S. PATENT DOCUMENTS

| 4,522,336 A | 6/1985 | Culp |
|---|---|---|
| 6,688,384 B2 | 2/2004 | Eoga |
| 7,058,477 B1 | 6/2006 | Rosen |

(Continued)

OTHER PUBLICATIONS

Ibacos, Innovational, Low-Load HVAC Systems for Single and Multifamily Applications by Anthony Grisolia, et al. Nov. 18, 2015.

(Continued)

*Primary Examiner* — Kidest Bahta
(74) *Attorney, Agent, or Firm* — Foley & Lardner LLP

(57) ABSTRACT

Systems and methods are provided for monitoring and controlling one or more environmental conditions of a building. The method comprises obtaining feedback from a first sensor at a first location within the building and feedback from a second sensor at a second location within the building. The method further comprises combining the feedback from the first sensor with the feedback from the second sensor in a weighted manner to generate a combined feedback, wherein a weight of the feedback from the first sensor relative to a weight of the feedback from the second sensor is based on a time of day. The method finally comprises operating HVAC equipment to drive the combined feedback toward a setpoint for the building.

20 Claims, 7 Drawing Sheets

(56) References Cited

U.S. PATENT DOCUMENTS

| | | | |
|---|---|---|---|
| 7,600,694 B2 | 10/2009 | Helt et al. | |
| 2008/0006708 A1 | 1/2008 | Gauger et al. | |
| 2012/0228393 A1* | 9/2012 | Storm .................... | G05D 22/02 236/44 A |
| 2013/0261807 A1* | 10/2013 | Zywicki ................... | F24F 11/30 700/278 |
| 2016/0025367 A1* | 1/2016 | Matsuoka ................ | F24F 11/62 700/276 |

OTHER PUBLICATIONS

Thermostats: Setting up multiple thermostats in a 2-story home, Sierra LLC Air Conditioning and Heating published Mar. 29, 2016 (YouTube).

* cited by examiner

SYSTEMS AND METHODS FOR CONTROLLING A SINGLE-ZONE CLIMATE CONDITIONING SYSTEM IN A MULTI-ZONED MANNER

BACKGROUND

The present disclosure relates generally to building management systems. The present disclosure relates more particularly to systems and methods for controlling a building using a single-zone climate conditioning system to affect a space in a multi-zoned manner.

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout the disclosure, such devices are referred to as BMS devices or building equipment.

In some BMS systems, such as in a residential system, the BMS is set to operate as a single zoned system. Thus, there is often times one set of building equipment to control the environmental conditions of the entire residence via the HVAC system. It may be desirable to modulate the setpoints of the HVAC system throughout the day based on factors such as time of day, building occupancy, etc., in order to provide maximum comfort and efficiency to the user. However, these factors may differ based on the particular room and location within the residency, but due to the single-zone system, the various rooms are unable to be controlled individually. The advantages of a multi-zoned system is that different zones may have setpoints that have different ideal temporal variation, and may be controlled individually. However, the cost of converting a single-zone system to a multi-zone system in order to control the zones individually can be substantial. Thus, it would be advantageous to have the benefits of a multi-zone system without the expense. Additionally, it would be advantageous to have systems and methods for using a single-zone climate conditioning system to affect space in a multi-zoned manner.

SUMMARY

One implementation of the present disclosure is a method for monitoring and controlling one or more environmental conditions of a building. The method comprises obtaining feedback from a first sensor at a first location within the building and feedback from a second sensor at a second location within the building. The method further comprises combining the feedback from the first sensor with the feedback from the second sensor in a weighted manner to generate a combined feedback, wherein a weight of the feedback from the first sensor relative to a weight of the feedback from the second sensor is based on a time of day. The method finally comprises operating HVAC equipment to drive the combined feedback toward a setpoint for the building.

In some embodiments, the method further comprises determining a predicted occupancy of the first location and the second location based on the time of day and adjusting at least one of the weights of the feedback from the first sensor or the weight of the feedback from the second sensor using the predicted occupancy.

In some embodiments, the method further comprises determining a difference between the feedback from the first sensor and the feedback from the second sensor and operating the HVAC equipment to reduce the difference between the feedback from the first sensor and the feedback from the second sensor in response to the difference reaching a threshold.

In some embodiments, the HVAC equipment comprises a recirculation fan and operating the HVAC equipment comprises operating the recirculation fan to reduce the difference between the feedback from the first sensor and the difference from the second sensor.

In some embodiments, the method further comprises comparing the feedback from the first sensor and the feedback from the second sensor to a second threshold and operating the HVAC equipment using the feedback from the first sensor without considering the feedback from the second sensor in response to the feedback from the first sensor reaching the threshold.

In some embodiments, the method further comprises identifying at least one of an importance of the first location or an importance of the second location and adjusting at least one weight of the feedback from the first sensor or the weight of the feedback from the second sensor using the importance of the first location or the importance of the second location.

In some embodiments, the method further comprises determining that the first location is more important than the second location and operating the HVAC equipment in a manner predicted to move the feedback from the first sensor toward the setpoint and move the feedback from the second sensor away from the setpoint in response to determining that the first location is more important than the second location.

Another implementation of the present disclosure is a method for monitoring and controlling one or more environmental conditions of a building. The method includes obtaining feedback from a first sensor at a first location within the building and feedback from a second sensor at a second location within the building. The method further includes identifying an importance of the first location and an importance of the second location. Finally, the method includes operating HVAC equipment in a manner predicted to move the feedback from the first sensor toward a setpoint for the building and move the feedback from the second sensor away from the setpoint in response to determining that the first location is more important than the second location.

In some embodiments, the method further comprises combining the feedback from the first sensor with the feedback from the second sensor in a weighted manner to generate a combined feedback, wherein a weight of the feedback from the first sensor relative to a weight of the feedback from the second sensor is based on at least one of the importance of the first location or the importance of the second location and operating the HVAC equipment to drive the combined feedback toward the setpoint for the building.

In some embodiments, the method further comprises operating the HVAC equipment by exchanging air between the first location and the second location in response to predicting that exchanging the air between the first location and the second location will move the feedback from the first sensor toward the setpoint.

In some embodiments, the method further comprises combining the feedback from the first sensor with the feedback from the second sensor in a weighted manner to generate a combined feedback, wherein a weight of the feedback from the first sensor relative to a weight of the feedback from the second sensor is based on a time of day and operating the HVAC equipment to drive the combined feedback toward the setpoint for the building.

In some embodiments, the method further comprises determining a difference between the feedback from the first sensor and the feedback from the second sensor and operating the HVAC equipment to reduce the difference between the feedback from the first sensor and the feedback from the second sensor in response to the difference reaching a threshold.

In some embodiments, the HVAC equipment comprises a recirculation fan and operating the HVAC equipment comprises operating the recirculation fan to reduce the difference between the feedback from the first sensor and the difference from the second sensor.

In some embodiments, the method further comprises comparing the feedback from the first sensor to a threshold and operating the HVAC equipment using the feedback from the first sensor without considering the feedback from the second sensor in response to the feedback from the first sensor reaching the threshold.

Another implementation of the present disclosure is a method for monitoring and controlling one or more environmental conditions of a building. The method comprises obtaining feedback from a first sensor at a first location within the building and feedback from a second sensor at a second location within the building. The method further comprises determining a difference between the feedback from the first sensor and the feedback from the second sensor. Finally, the method comprises operating HVAC equipment to reduce the difference between the feedback from the first sensor and the feedback from the second sensor in response to the difference reaching a threshold.

In some embodiments, the HVAC equipment comprises a recirculation fan and operating the HVAC equipment comprises operating the recirculation fan to reduce the difference between the feedback from the first sensor and the feedback from the second sensor.

In some embodiments, the method further comprises combining the feedback from the first sensor with the feedback from the second sensor in a weighted manner to generate a combined feedback, wherein a weight of the feedback from the first sensor relative to a weight of the feedback from the second sensor is based on a time of day and operating the HVAC equipment to drive the combined feedback toward a setpoint for the building.

In some embodiments, the method further comprises identifying at least one of an importance of the first location or an importance of the second location, combining the feedback from the first sensor with the feedback from the second sensor in a weighted manner to generate a combined feedback, wherein a weight of the feedback from the first sensor relative to a weight of the feedback from the second sensor is based on at least one of the importance of the first location or the importance of the second location, and operating the HVAC equipment to drive the combined feedback toward a setpoint for the building.

In some embodiments, the method further comprises determining that the first location is more important than the second location and operating the HVAC equipment in a manner predicted to move the feedback from the first sensor toward a setpoint for the building and move the feedback from the second sensor away from the setpoint in response to determining that the first location is more important than the second location.

In some embodiments, the method further comprises comparing the feedback from the first sensor to a threshold and operating the HVAC equipment using the feedback from the first sensor without considering the feedback from the second sensor in response to the feedback from the first sensor reaching the threshold.

Those skilled in the art will appreciate this summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
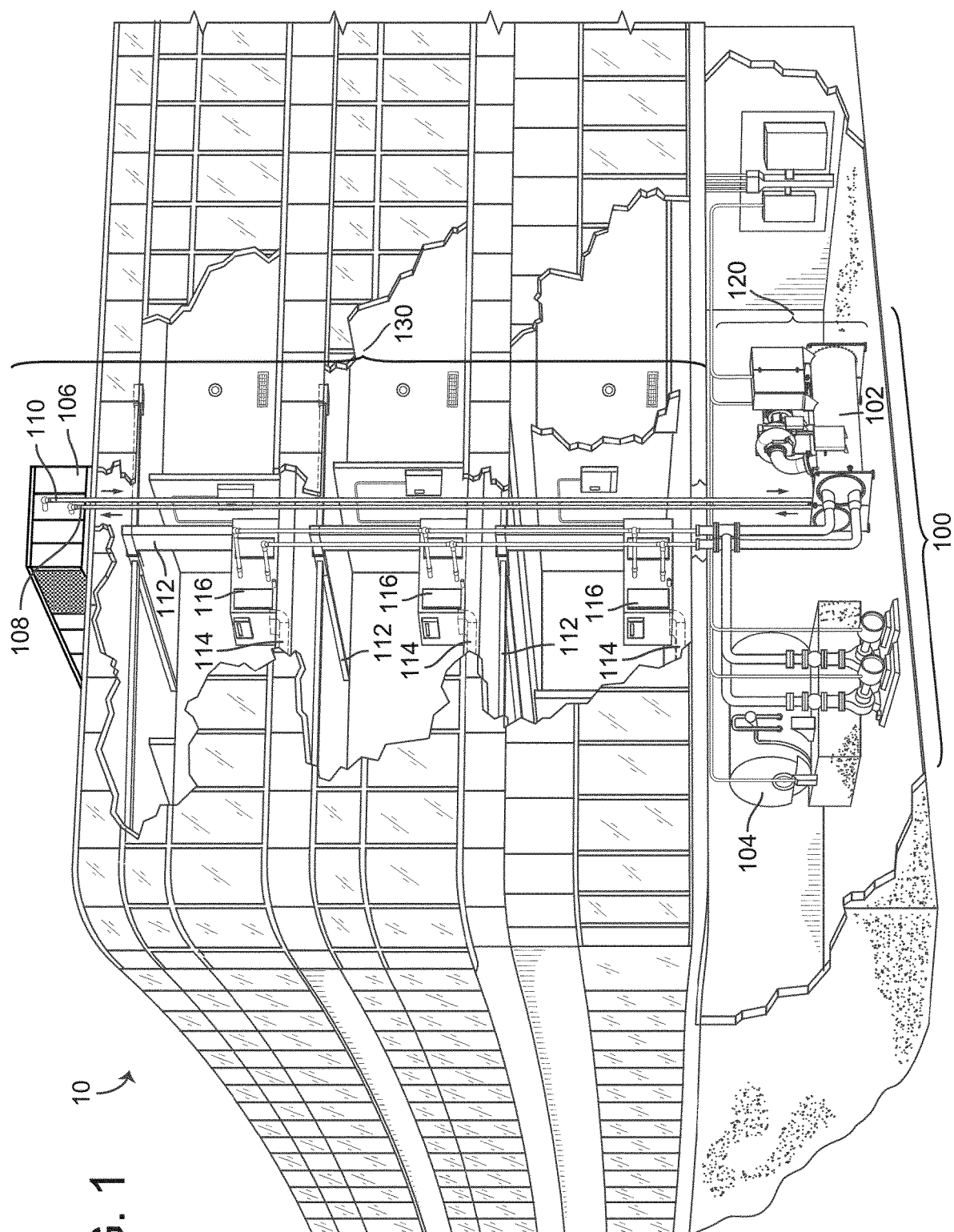
FIG. 1 is a drawing of a building equipped with a building management system (BMS) and a HVAC system, according to some embodiments.

Before returning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the figures, a building management system (BMS) and various components thereof are shown, according to an exemplary embodiment. The BMS includes sensors, building equipment, a building controller, and a heating, ventilation, and air conditioning (HVAC) control system. The sensors monitor variables in or around a building and the building equipment operates to affect one or more of the monitored variables. In some embodiments, the sensors may be thermostats and may operate to affect the temperature of the building. The building may include a single-zoned system, such as a residence, with multiple sensors located throughout the single-zoned system. For example, a main sensor may be located on the ground level of the residence while a secondary sensor may be located on an upper level of the residence. The systems and methods described herein provide a control process to operate the multiple sensors together in order to control the building equipment throughout the residence based on predicted locations of the occupants, a proximity of the occupants in relation to the sensors, a time of day, an override feature for freeze protection, or a variety of other factors.

In some embodiments, systems, and methods described herein provide a mechanism to control a single-zone system in a multi-zone manner. As indicated above, sensors may be located within different areas of a residency. The multiple sensors can be operated together in order to control the environmental conditions of the entire residence via a single set of building equipment based on predicted locations of the occupants within the residency and the occupants proximity to each of the sensors. Additionally, the sensors may be used to operate the building equipment using a weighted control process based upon the time of day. For example, during the mornings it may be common for occupants to remain in the upper level of the residency, as they get ready for the day. Thus, feedback from the sensor within the upper level may be weighted to operate to affect the temperature greater than a sensor on the main level of the residency in the mornings. In contrast, in the evenings it may be common for occupants to remain mostly on the main level of the residency Thus, the feedback from the sensor on the main level may be weighted in a greater manner than the other sensors during the evenings. The HVAC controller may implement a time based process in order to adjust the weights of the different sensors based on the time of day.

In some embodiments, the systems and methods descried herein also provide a control process for an HVAC system to override normal operation of the HVAC system in order to prevent from freezing the various building equipment, such as pipes. Some locations within a residency, such as a sunroom or a garage, may be more likely to reach lower temperatures, and therefore are more susceptible to frozen pipes. Thus, it is advantageous to have a sensor within this location in order to detect when the temperature drops below an acceptable level. When the sensor provides feedback that the temperature within this location has dropped below an acceptable level, the HVAC controller may override normal operation of the building equipment in order to raise the temperature of this location to an acceptable level, even at the expense or discomfort of occupants in other areas of the residency. These and other features of the HVAC controller are described in greater detail below.

Building Management System and HVAC System

Referring now to FIGS. 1-4, an exemplary building management system (BMS) and a heating, ventilation, and air conditioning (HVAC) system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or device, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
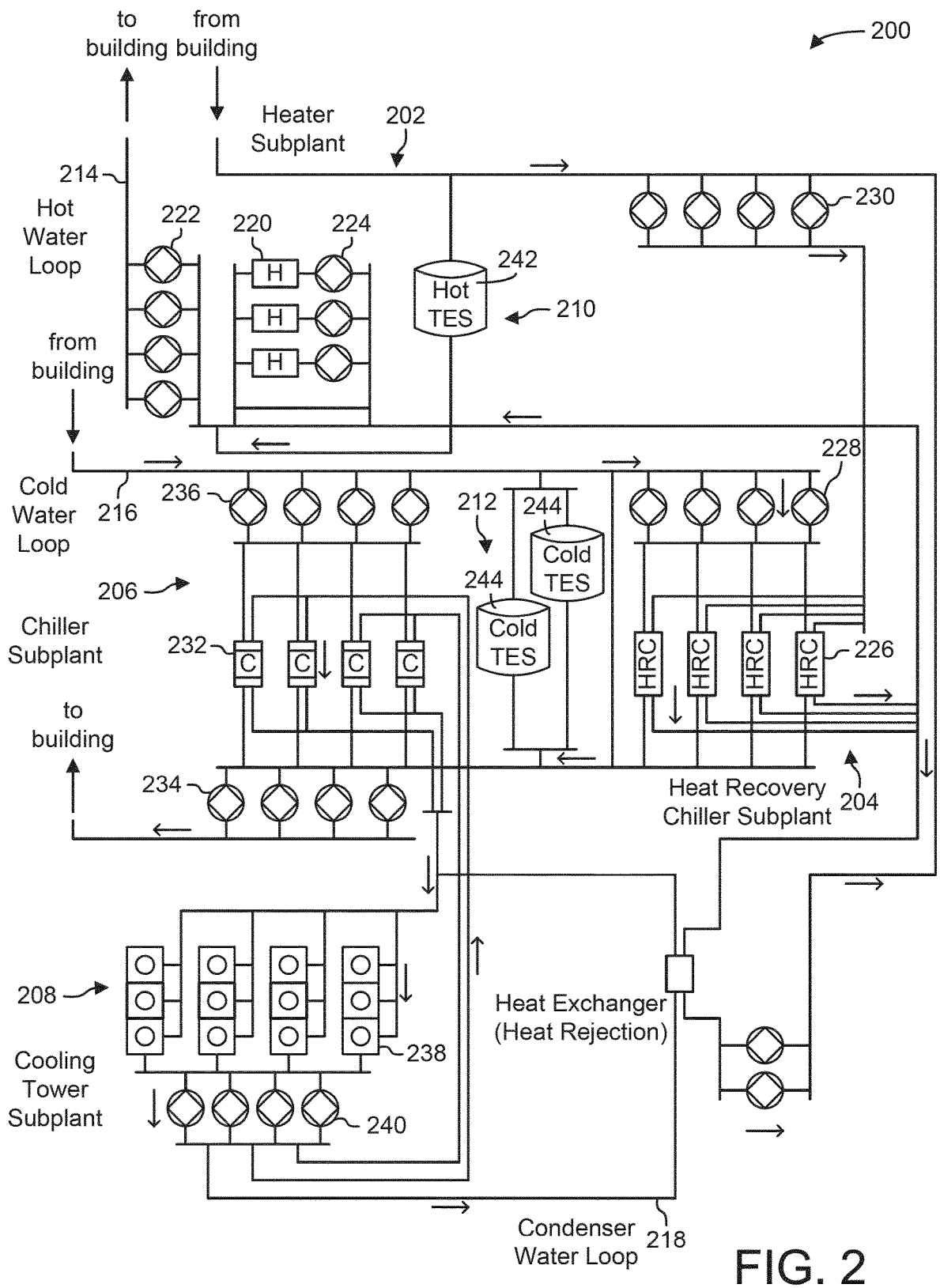
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and the building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
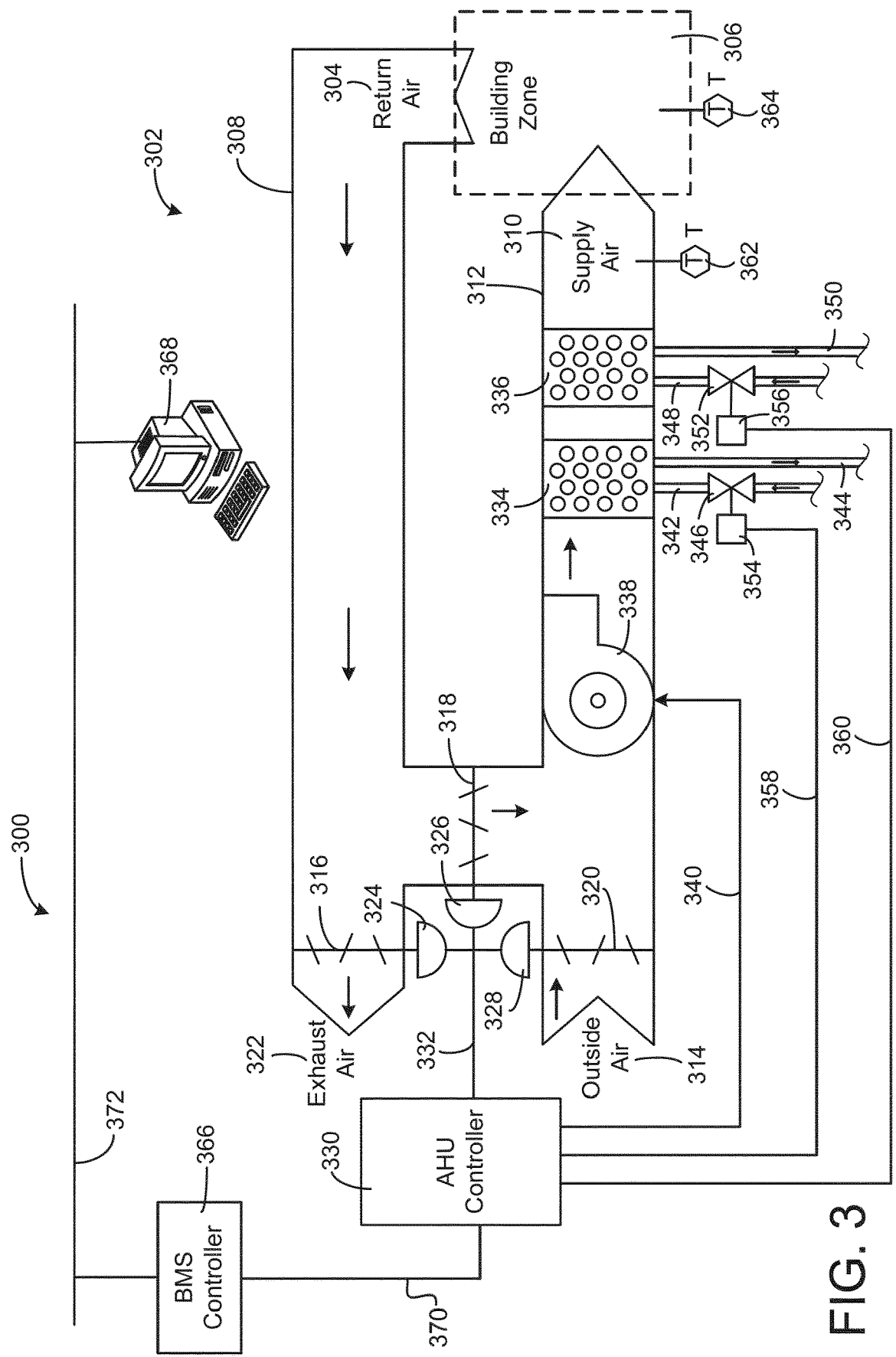
FIG. 3 is a block diagram illustrating an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive return air 304 and outside air 314. AHU 302 can be configured to operate an exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to AHU controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination thereof.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
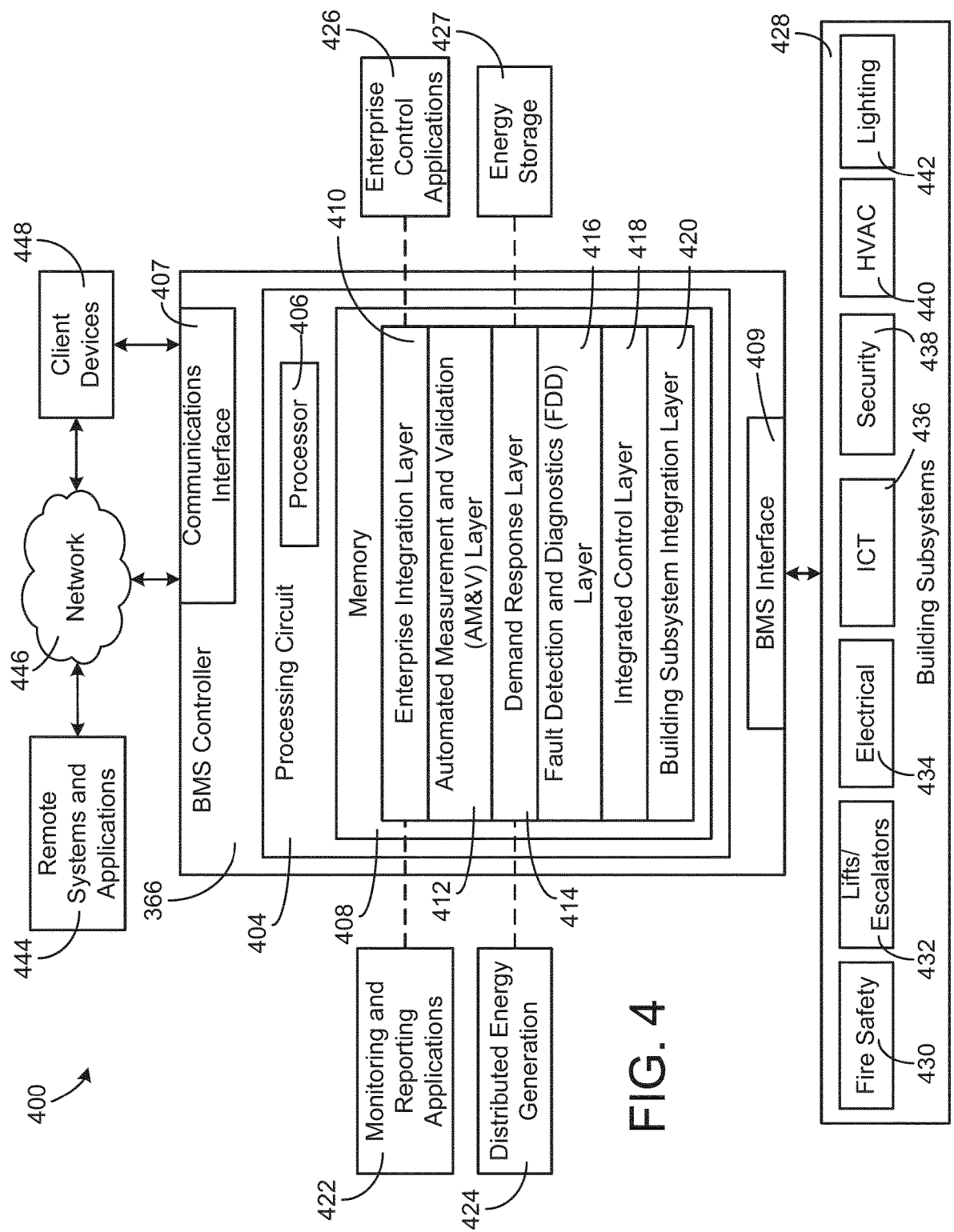
FIG. 4 is a block diagram illustrating a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Communications interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or building subsystems 428. Communications interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., locally wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, the interfaces 407, 409 can include a Wi-Fi transceiver for communicating via a wireless communications network. In another example, one or more of interfaces 407, 409 can include cellular or mobile phone communications transceivers. In one embodiment, communications interface 407 is a power line communications interface and BMS interface 409 is an Ethernet interface. In other embodiments, communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation system 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response layer 414 to make control decisions. Due to the subsystem integration provided by building subsystem integration layer 420, integrated control layer 418 can integrate control activities of the building subsystems 428 such that the subsystems 428 behave as a single integrated supersystem. In an exemplary embodiment, integrated control layer 418 includes control logic that uses inputs and outputs from a plurality of building subsystems 428 to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or ensure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

HVAC Control System

Figure 5:
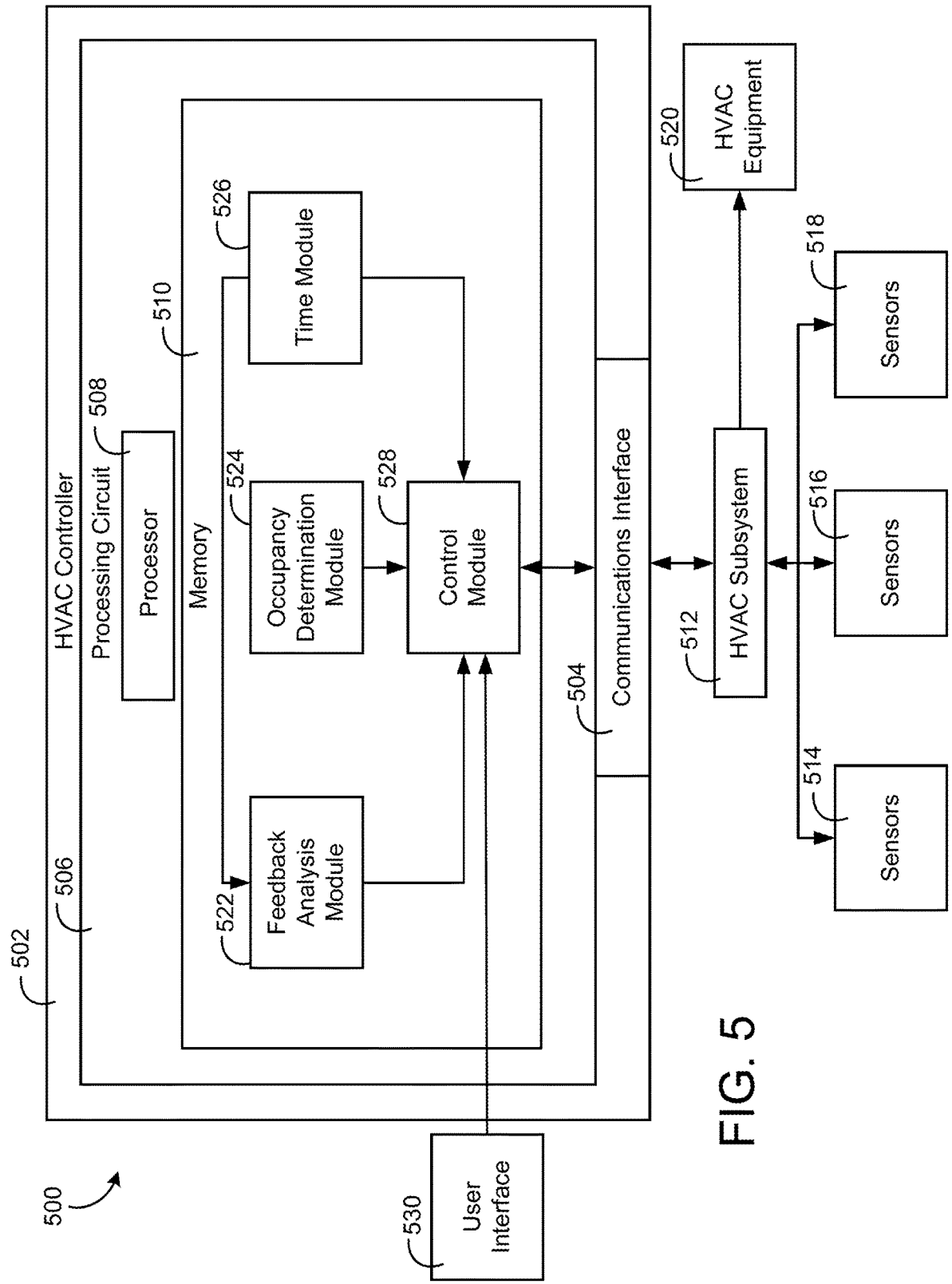
FIG. 5 is a block diagram of an HVAC system, which may be used to control HVAC equipment of the BMS, according to some embodiments.

Referring now to FIG. 5, a block diagram of a heating, ventilation, and air conditioning (HVAC) system 500 is shown, according to an exemplary embodiment. HVAC system 500 may include some of the same components of BMS 400, as described with reference to FIG. 4. Additionally, in some embodiments, HVAC system 500 may be included within BMS 400. In other embodiments, HVAC system 500 may be a separate system from BMS 500 is shown to include an HVAC controller 502. In some embodiments, HVAC controller 502 may be the same or similar to BMS controller 366, as described with references to FIG. 304. In other embodiments, the controller is a subsystem controller for the HVAC 440 building subsystem 428.

In some embodiments, HVAC controller 502 is a component of BMS controller 366 (e.g., within integrated control layer 418). For example, HVAC system 502 may be implemented as part of a METASYS® brand building automation system, as sold by Johnson Controls Inc. In still other embodiments, HVAC controller 502 may be a component of a subsystem level controller (e.g., a HVAC controller), a subplant controller, a device controller (e.g., AHU controller 330, a chiller controller, etc.), a field controller, a computer workstation, a client device, or any other system or device that receives and processes monitored variables from building subsystems 428.

HVAC controller 502 is shown to include a communications interface 504 and a processing circuit 506. The communications interface 504 facilitates communications between HVAC controller 502 and HVAC subsystem 512. In some embodiments, communications interface 504 may also facilitate communications between HVAC controller 502 and other building subsystems 428 as described in reference to FIG. 4 (e.g., lighting security, lifts, power distribution, business, etc.). Communications interface 504 can be or include wired or wireless communications interfaces (e.g., jacks, antennas, transmitters, receivers, transceivers, wire terminals, etc.) for conducting data communications with HVAC subsystem 512 or other external systems or devices. In various embodiments, communications via communications interface 504 can be direct (e.g., local wired or wireless communications) or via a communication network such as communications network 446 (e.g., a WAN, the Internet, a cellular network, etc.). For example, communications interface 504 can include an Ethernet card and port for sending and receiving data via an Ethernet-based communications link or network. In another example, communications interface 504 can include a Wi-Fi transceiver for communicating via a wireless communications network. In one embodiment, communications interface 504 is an Ethernet interface.

Still referring to FIG. 5, the processing circuit 506 is shown to include a processor 508 and memory 510. The processor 508 can be a general purpose or specific purpose processor, an application specific integrated circuit (ASIC), one or more field programmable gate arrays (FPGAs), a group of processing components, or other suitable processing components. The processor 508 is configured to execute computer code or instructions stored in memory or received from other computer readable media (e.g., CDROM, network storage, a remote server, etc.).

The memory 510 can include one or more devices (e.g., memory units, memory devices, storage devices, etc.) for storing data and/or computer code for completing and/or facilitating the various processes described in the present disclosure. The memory 510 can include random access memory (RAM), read-only memory (ROM), hard drive storage, temporary storage, non-volatile memory, flash memory, optical memory, or any other suitable memory for storing software objects and/or computer instructions. The memory 510 can include database components, object code components, script components, or any other type of information structure for supporting the various activities and information structures described in the present disclosure. The memory 510 can be communicably connected to the processor 508 via the processing circuit 506 and can include computer code for executing (e.g., by the processor 508) one or more processes described herein. When the processor 508 executes instructions stored in memory 510, the processor 508 generally configures the HVAC system 502 (and more particularly the processing circuit 506 to complete such activities.

Still referring to FIG. 5, the HVAC subsystem 512 is shown to include a plurality of sensors 514-518. Sensors 514-518 may be configured to provide information to HVAC system 502 through subsystem 512. Sensors 514-518 may include various sensors (e.g., temperature sensors, pressure sensors, etc.) configured to measure attributes of the air in the location of the sensors 514-518. HVAC controller 502 can receive input from sensors 514-518 and can adjust the flow rate, temperature, or other attributes of the building equipment through HVAC controller 502. In some embodiments, sensors 514-518 may be temperature sensors as a component of a thermostat, configured to provide readings of the temperature within a given location. In some embodiments, the temperature readings provided by sensors 514-

518 may be used to drive a control process in order to provide control signals, such as particular setpoints, to achieve the desired temperature within the building. In other embodiments, sensors 514-518 may be configured to measure other attributes of the climate, and the input from sensors 514-518 can be used to modify the control signals in order to adjust the flow rate or other attributes of the air within the building.

In some embodiments, HVAC controller 502 is separate from sensors 514-518 and configured to receive feedback from sensors 514-518 via communications interface 504. In some embodiments, one of more of the sensors 514-518 may be a component of a thermostat, such as a smart thermostat, or of a controller, such as the HVAC controller 502 itself, and the feedback may be include a temperature. In some embodiments, sensors 514-518 may be positioned in various locations of a building. For example, in a single-zoned building such as a residency, sensors 514-518 may be located on different floors of the residency. In some embodiments, one of the sensors 514-518 may serve as a main thermostat that is located within a central area of the building, such as on the main floor, and that controls the other thermostats. The other sensors 514-518 may be located on a lower level, an upper level, in the garage, or in any other secondary locations within the building. The building may include one or more rooms within a residency, school, or any other environment-controlled space. HVAC equipment 520 can include any type of equipment operable to affect the temperature, humidity, and/or other environmental conditions of the building. For example, HVAC equipment 520 can include a recirculation fan, home furnace, air conditioning unit, one or more chillers, boilers, air handling units, rooftop units, dampers, or other types of HVAC equipment configured to affect the environment of the building within HVAC system 500 is located.

HVAC controller 502 can be configured to receive measurements from sensors 514-518. HVAC controller 502 is also configured to obtain a setpoint for the HVAC equipment 520 as an input, in the form of a desired temperature for the building. In some embodiments, the input may be received via user interface 530. The HVAC controller 502 is then configured to use the setpoints and the feedback from sensors 514-518 in order to generate control signals for the HVAC equipment 520. The HVAC equipment 520 may then be operated according to the control signals in order to provide variable amounts of heating or cooling to the building. By controlling the setpoints, HVAC controller 502 can modulate the amount of heating or cooling provided by the HVAC equipment 520, thereby affecting the temperature, or other attributes of the building, in order to drive the environmental condition of the building toward the setpoints for the building.

To determine the control signals for the HVAC equipment 520, HVAC controller 520 can execute a control process that takes into account the desired conditions of the building, based on the input setpoints, as well as the feedback received from sensors 514-518, in order to account for different ideal temperature variations within the different locations of the building where the sensors 514-518 are located. The execution of the control process can include, for example, at least one of an estimation of occupancy within the building, a time, such as clock time or calendar time, a threshold comparison, and a desired building condition. Using these factors, HVAC controller 502 can generate control signals for the HVAC equipment 520 in order to drive the conditions of the building toward a desired building condition, such as a desired temperature.

Still referring to FIG. 5, HVAC controller 502 is shown to include a feedback analysis module 522, an occupancy determination module 524, a time module 526, and a control module 528. In a brief overview, feedback analysis module 522 can be configured to evaluate the feedback regarding from the sensors 514-518. Occupancy determination module 524 can be configured to predict the occupant density at various locations within the building. In some embodiments, occupancy may be based on a time of day. The time may be determined by time module 526. Time module 526 can be configured to determine a time of day, a time of year, or any other function of time, whether clock time or calendar time, and to provide this time to the control module 528. Control module 528 is configured to combine the information from feedback analysis module 522, occupancy determination module 524, time module 526, as well as the input setpoints, in order to generate the control signals for the HVAC equipment 520.

Feedback analysis module 522 is configured to receive and analyze the feedback from sensors 514-518. Feedback received from sensors 514-518 may include a current temperature reading within the location of each of the sensors 514-518. Feedback analysis module 522 may analyze the temperature reading of each of the sensors 514-518 based on a priority of the sensors 514-518 due to their locations. For example, in some embodiments, sensor 514 may be indicated to be the main sensor or thermostat, and may be located in a main area within the building, such as on the main level. Sensors 516-518 may act as secondary sensors, and may be located in less important areas within the building, such as in a lower level or in the garage. In this case, the feedback from these sensors is not as important as feedback from the main sensor 514. In these embodiments, feedback from sensors 516-518 may only be used in a secondary control process, as described in more detail below. The feedback from the sensors 514-518 may be combined in a weighted manner. The weight of the difference sensors 514-518 wherein the relative importance of the In other embodiments, feedback from sensors 514-518 may all be of equal importance to feedback analysis module 522, and feedback analysis module 522 may simply act to combine the feedback.

In some embodiments, feedback analysis module 522 is configured to determine a difference in the feedback from each of the sensors 514-518. For example, if the feedback from the sensors 514-518 is temperature, the feedback analysis module determines a difference between the temperature of the location in which sensor 514 is located and the temperature of the location in which sensor 516 is located. Feedback analysis module 522 may then be configured to compare the difference in feedback to a threshold. In some embodiments, the threshold may be predetermined or may be modified based on user input to the desired building conditions. If the difference in feedback is above the threshold, feedback analysis module 522 may indicate to control module 528 to provide control signals to reduce the difference, as described in more detail below.

Occupancy determination module 524 is configured to provide an occupancy estimation to control module 528. In some embodiments, occupancy may solely be based on an estimated value of occupancy based on the current time. Time module 526 may be configured to provide the current time to occupancy determination module 524. Occupancy determination module 524 can then determine the occupancy of the locations within which the sensors 514-518 are placed. For example, sensor 514 may be located on the main level of the building. When time module 526 indicates that it is the evening, occupancy determination module 524 may predict that most or all of the residents of the building are located on this main level. Thus, feedback from sensor 514 may be prioritized during the evenings, as most of the residents of the building are located on the main level. In another example, sensor 516 may be located on an upper level of the building, which may be where the residents' bedrooms/bathrooms are located. When time module 526 indicates that it is the morning, occupancy determination module 524 may predict that most or all of the residents of the building are located on this upper level, as they are likely just waking up and getting ready for the day. Thus, feedback from sensor 516 may be prioritized during the mornings, as most of the residents of the building are on the upper level. In other embodiments, sensors 514-518 may further include occupancy sensors, configured to provide a real-time occupancy of the various locations within the building to the control module 528.

As indicated above, time module 526 is configured to determine a current time within the building. Current time may related to clock time, such as the time of day, or calendar time, such as the time of year. Time module 526 provides the current time to the occupancy determination module 524 in order to estimate an occupancy of the various locations within the building. Feedback analysis module, 522, occupancy determination module 524, and time module 526 are configured to provide input to control module 528.

Control module 528 is also configured to receive input related to preferred climate conditions for the building. In some embodiments, preferred climate conditions may be received via user interface 530. User interface 530 may be a component of a mobile device, a website, included within sensors 514-518, or any other interface configured to allow a user to provide input to the HVAC controller 502. Preferred climate conditions may include a preferred temperature of the building, or any other preferred conditions for the building space. Preferred climate conditions may include input regarding temperature setpoints for the HVAC equipment 520 based solely on the input received via the user interface 530. In other embodiments, the preferred climate conditions may be generated by the HVAC controller 502 itself, without requiring any user input.

Control module 528 is configured to combine the input from feedback analysis module 522, occupancy determination module 524, time module 526, and the preferred climate conditions from the user interface 530 into a primary control process. Control module 528 is configured to combine the input from the modules 522-526 and preferred climate conditions in a weighted manner. Control module 528 may combine the input in a weighted manner based on the time and the occupancy of the locations within the building. For example, time module 528 may indicate that it is the evening time, and occupancy module 526 may predict that the residents are located on the main level during this evening time. If sensor 514 is located on the main level, sensor 514 may temporarily become the primary sensor during the evening time. Thus, the feedback received from sensor 514 is weighted higher than the feedback from sensors 516-518, which may be acting as secondary sensors during this evening time. In some embodiments, if it is predicted that no residents will occupy the locations of sensors 516-518 during the current time, the feedback from sensors 516-518 may not be included in the control process during this time. In other embodiments, the importance of the feedback from sensors 514-518 is based not on occupancy of the locations, but on a relative importance of the locations within which the sensors 514-518 are located. Thus, the feedback from the sensors 514-518 may be weighted based on the importance of the sensors location 514-518. In some embodiments, control module 528 may implement a formula to combine the feedback from sensors 514-518. Once the feedback from the sensors 514-518 has been weighted, control module 528 may use the weighted feedback and the preferred climate conditions in order to generate the control signals for HVAC equipment 520 in order to achieve those preferred climate conditions. The primary control process may generate control signals for the HVAC equipment 520 to operate in order to drive the climate conditions of the building towards the preferred climate conditions. In some embodiments, such as when the feedback from the sensors 514-518 is weighted based on the importance of the locations at which sensors 514-518 are located, control module 528 may generate control signals that will operate HVAC equipment 520 in order to move the feedback from one of the sensors 514 towards a setpoint for the building while simultaneously moving the feedback from another sensor 516 away from the setpoint if it is determined that the location of the first sensor 514 is more important than the location of the second sensor 516.

In some embodiments, the primary control process, as generated by control module 528, may be interrupted by a secondary control process, which may override the current operation of the HVAC equipment 520. A secondary control process may be independent of the primary control process, and may provide better comfort at better energy efficiency during times when temperature differences as determined by the sensors 514-518 in different locations are appreciable. Alternatively, the secondary control process may be implemented as a preventative process, in order to prevent from damage occurring to the HVAC equipment 520. This secondary control process may be implemented if feedback from one of the sensors 514-518 crosses a threshold, such as a low or high temperature threshold.

In some embodiments, the secondary control process may include a process for operating a specific piece of HVAC equipment 520, such as a recirculation fan. In some embodiments, feedback from sensors 514-518 may be compared by feedback analysis module 522 in order to determine a difference in the feedback from the sensors 514-518. For example, a difference in the temperature determined by each sensor 514-518 may be compared by feedback analysis module 522. If the difference in temperature crosses a threshold, the secondary control process may be implemented in combination with the primary control process in order to reduce the difference in temperature. For example, if sensor 514 is located on the main level of the building, the temperature reading may be cooler than that of sensor 516 located on the upper level of the building, as warmer air tends to rise. If this difference in temperature between the main level and the upper level crosses a threshold, the secondary control process may be implemented in order to run a recirculation fan in order to mix the cool air of the main level with the warmer air of the upper level. This secondary control process may be implemented in order to provide better comfort to occupants on both the main level and the upper level, while still maximizing efficiency. In some embodiments, the secondary control process may cause the recirculation fan to run for a set period of time, or until the difference in temperature drops back below the given threshold.

In other embodiments, the secondary control process may be a preventative process, and may be implemented based on feedback from the sensors 514-518 crossing a threshold. For example, one of the sensors 514-518, such as sensor 518, may be located in a spot within the building that is more likely to have freezing issues, such as pipes of the HVAC equipment 520 freezing if the temperature within that location drops too low. Thus, there may be a threshold level for temperature within that location. If the temperature within that location, as determined by sensor 518, drops below the threshold, control module 528 may immediately provide updated control signals to the HVAC equipment 520 in order to raise the temperature above the threshold, regardless of the feedback from the other sensors 514-516. Thus, this drop below the threshold may cause control module to override normal operation of the HVAC equipment 520 in order to prevent from freezing the HVAC equipment. Sensors 514-518 may all have different thresholds based on their location, and may constantly be monitoring to ensure that these thresholds are not crossed. In some embodiments, sensors 514-518 may generate an alert upon the feedback crossing the thresholds, which is received by control module 528. Upon receiving this alert, control module 528 may begin implementing the secondary control process in order to cross back over the threshold into an acceptable value as quickly as possible.

Figure 6:
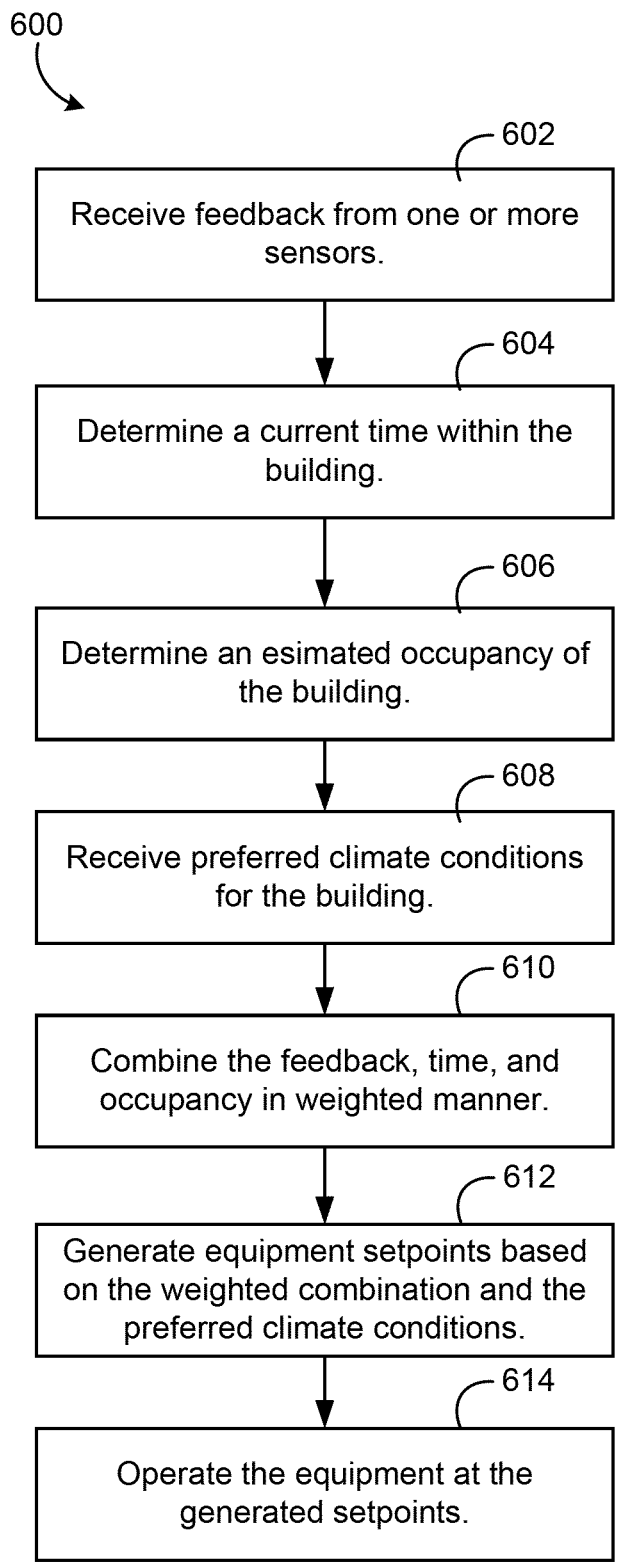
FIG. 6 is a flowchart of a process which can be performed by the HVAC controller of FIG. 5, according to some embodiments.

Referring now to FIG. 6, a flowchart of a process 600 for implementing the primary control process is shown, according to an exemplary embodiment. Process 600 can be performed by one or more components of the HVAC system 500, as described with reference to FIG. 5. For example, process 600 can be performed by HVAC controller 502, sensors 514-518, HVAC equipment 520, and/or any other components as described above to control the climate conditions of a building.

Process 600 begins by receiving feedback from one or more sensors (step 602) within the building. Sensors may be sensors 514-518 as described above. In some embodiments, the sensors may include a main thermostat and one or more secondary thermostats. Sensors may be located in various rooms or levels within the building, such that the feedback from each of the sensors corresponds to a certain location within the building.

Next, a current time within the building is determined (step 604). The current time within the building may correspond to a clock time, such as time of day, or calendar time, such as a time of year. In some embodiments, the time is determined by time module 526 as described above. In other embodiments, the time is preset within the HVAC controller 502, or may be updated as necessary by user interface 530.

Next, an occupancy within the building is determined (step 606). The occupancy of the building may provide an occupancy for each location within the building in which a sensor is located. In some embodiments, the occupancy is determined by occupancy determination module 528, as described above. The occupancy may be a predicted occupancy, based on the time of day or time of year. In other embodiments, the occupancy may be a real-time occupancy, based on one or more occupancy sensors located within the building.

Next, preferred climate conditions for the building are determined (step 608). The preferred climate conditions may be received via user input from a user interface. In some embodiments, the preferred climate conditions may be programmed into the HVAC controller 502 such that they are predetermined. In other embodiments, preferred climate conditions may be generated without the need for user input, such as by an application within HVAC controller 502.

Next, the feedback from the sensors are combined, wherein the combination is performed in a weighted manner such that the weight assigned to the feedback from each sensor is based upon the time of day and the occupancy of the location of that sensor (step 610). In some embodiments, control module 528 may be configured to combine these factors as indicated above. The feedback from sensors is prioritized based on one or more of an occupancy within the locations of the sensors or a time of day. This combination may occur at set intervals throughout the day, such as every hour, or may be updated in real-time, such that the control process is constantly changing.

Next, the weighted combination determined in step 610 is combined with the preferred climate conditions in order to generate control signals (step 612). Finally, the generated control signals are provided to the HVAC equipment in order to drive the climate of the building towards the equipment setpoints (step 614).

Figure 7:
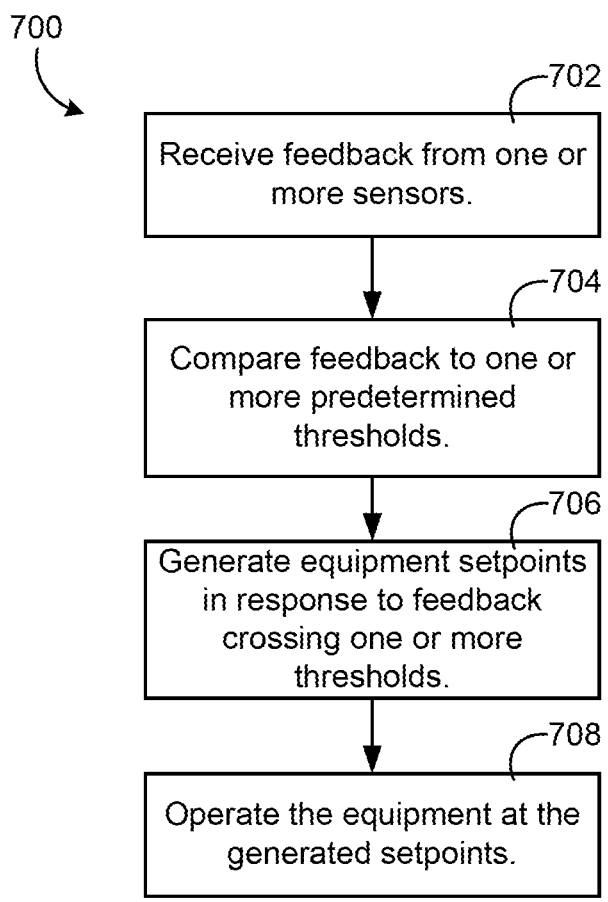
FIG. 7 is a flowchart of another process which can be performed by the HVAC controller of FIG. 5, according to some embodiments.

Referring now to FIG. 7, a flowchart of a process 700 for implementing the secondary control process is shown, according to an exemplary embodiment. Process 700 can be performed by one or more components of the HVAC system 500, as described with reference to FIG. 5. For example, process 700 can be performed by HVAC controller 502, sensors 514-518, HVAC equipment 520, and/or any other components as described above to control the climate conditions of a building. Process 700 can be performed simultaneously as process 600, or may be performed independently of process 600 in order to override the primary control process.

Process 700 begins by receiving feedback from one or more sensors (step 602) within the building. Sensors may be sensors 514-518 as described above. In some embodiments, the sensors may include a main thermostat and one or more secondary thermostats. Sensors may be located in various rooms or levels within the building, such that the feedback from each of the sensors corresponds to a certain location within the building.

Next, the feedback from the one or more sensors is compared to predetermined thresholds (step 704). In some embodiments, the predetermined thresholds comprise a threshold for a difference in feedback from the one or more sensors. In other embodiments, the predetermined thresholds comprise a low/high temperature threshold for a location within the building.

Next, control signals are generated based on the feedback crossing one or more of the thresholds (step 706). For example, if the temperature is determined to be below a threshold, control signals are generated for the building equipment 520 in order to raise the temperature. This will override the normal control signals, as determined by the primary control process, for temperature. In another example, if the difference between feedback from two or more of the sensors exceeds a threshold, control signals may be generated for a particular piece of building equipment fan, such as a recirculation fan, in order to reduce the difference. This will not override the normal operation of the HVAC equipment, and will simply act in coordination with the primary control process. Finally, the generated control signals are provided to the HVAC equipment in order to drive the climate of the building towards the equipment setpoints (step 708).

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for monitoring and controlling one or more environmental conditions of a building, the method comprising:
    obtaining feedback from a first sensor at a first location within the building and feedback from a second sensor at a second location within the building;
    combining the feedback from the first sensor with the feedback from the second sensor in a weighted manner to generate a combined feedback, wherein a weight of the feedback from the first sensor relative to a weight of the feedback from the second sensor is based on a time of day;
    operating HVAC equipment to drive the combined feedback toward a setpoint for the building.

2. The method of claim 1, further comprising:
    determining a predicted occupancy of the first location and the second location based on the time of day; and
    adjusting at least one of the weight of the feedback from the first sensor or the weight of the feedback from the second sensor using the predicted occupancy.

3. The method of claim 1, further comprising:
    determining a difference between the feedback from the first sensor and the feedback from the second sensor; and
    operating the HVAC equipment to reduce the difference between the feedback from the first sensor and the feedback from the second sensor in response to the difference reaching a threshold.

4. The method of claim 3, wherein the HVAC equipment comprises a recirculation fan and operating the HVAC equipment comprises operating the recirculation fan to reduce the difference between the feedback from the first sensor and the difference from the second sensor.

5. The method of claim 1, further comprising:
    comparing the feedback from the first sensor to a threshold; and
    operating the HVAC equipment using the feedback from the first sensor without considering the feedback from the second sensor in response to the feedback from the first sensor reaching the threshold.

6. The method of claim 1, further comprising:
    identifying at least one of an importance of the first location or an importance of the second location;
    adjusting at least one of the weight of the feedback from the first sensor or the weight of the feedback from the second sensor using the importance of the first location or the importance of the second location.

7. The method of claim 1, further comprising:
    determining that the first location is more important than the second location; and
    operating the HVAC equipment in a manner predicted to move the feedback from the first sensor toward the setpoint and move the feedback from the second sensor away from the setpoint in response to determining that the first location is more important than the second location.

8. A method for monitoring and controlling one or more environmental conditions of a building, the method comprising:
    obtaining feedback from a first sensor at a first location within the building and feedback from a second sensor at a second location within the building;
    identifying an importance of the first location and an importance of the second location;
    operating HVAC equipment in a manner predicted to move the feedback from the first sensor toward a setpoint for the building and move the feedback from the second sensor away from the setpoint in response to determining that the first location is more important than the second location.

9. The method of claim 8, further comprising:
    combining the feedback from the first sensor with the feedback from the second sensor in a weighted manner to generate a combined feedback, wherein a weight of the feedback from the first sensor relative to a weight of the feedback from the second sensor is based on at least one of the importance of the first location or the importance of the second location; and
    operating the HVAC equipment to drive the combined feedback toward the setpoint for the building.

10. The method of claim 8, wherein operating the HVAC equipment comprises exchanging air between the first location and the second location in response to predicting that exchanging the air between the first location and the second location will move the feedback from the first sensor toward the setpoint.

11. The method of claim 8, further comprising:
combining the feedback from the first sensor with the feedback from the second sensor in a weighted manner to generate a combined feedback, wherein a weight of the feedback from the first sensor relative to a weight of the feedback from the second sensor is based on a time of day; and
operating the HVAC equipment to drive the combined feedback toward the setpoint for the building.

12. The method of claim 8, further comprising:
determining a difference between the feedback from the first sensor and the feedback from the second sensor; and
operating the HVAC equipment to reduce the difference between the feedback from the first sensor and the feedback from the second sensor in response to the difference reaching a threshold.

13. The method of claim 12, wherein the HVAC equipment comprises a recirculation fan and operating the HVAC equipment comprises operating the recirculation fan to reduce the difference between the feedback from the first sensor and the difference from the second sensor.

14. The method of claim 8, further comprising:
comparing the feedback from the first sensor to a threshold; and
operating the HVAC equipment using the feedback from the first sensor without considering the feedback from the second sensor in response to the feedback from the first sensor reaching the threshold.

15. A method for monitoring and controlling one or more environmental conditions of a building, the method comprising:
obtaining feedback from a first sensor at a first location within the building and feedback from a second sensor at a second location within the building;
determining a difference between the feedback from the first sensor and the feedback from the second sensor; and
operating HVAC equipment to reduce the difference between the feedback from the first sensor and the feedback from the second sensor in response to the difference reaching a threshold.

16. The method of claim 15, wherein the HVAC equipment comprises a recirculation fan and operating the HVAC equipment comprises operating the recirculation fan to reduce the difference between the feedback from the first sensor and the feedback from the second sensor.

17. The method of claim 15, further comprising:
combining the feedback from the first sensor with the feedback from the second sensor in a weighted manner to generate a combined feedback, wherein a weight of the feedback from the first sensor relative to a weight of the feedback from the second sensor is based on a time of day; and
operating the HVAC equipment to drive the combined feedback toward a setpoint for the building.

18. The method of claim 15, further comprising:
identifying at least one of an importance of the first location or an importance of the second location;
combining the feedback from the first sensor with the feedback from the second sensor in a weighted manner to generate a combined feedback, wherein a weight of the feedback from the first sensor relative to a weight of the feedback from the second sensor is based on at least one of the importance of the first location or the importance of the second location; and
operating the HVAC equipment to drive the combined feedback toward a setpoint for the building.

19. The method of claim 15, further comprising:
determining that the first location is more important than the second location; and
operating the HVAC equipment in a manner predicted to move the feedback from the first sensor toward a setpoint for the building and move the feedback from the second sensor away from the setpoint in response to determining that the first location is more important than the second location.

20. The method of claim 15, further comprising:
comparing the feedback from the first sensor to a threshold; and
operating the HVAC equipment using the feedback from the first sensor without considering the feedback from the second sensor in response to the feedback from the first sensor reaching the threshold.

* * * * *